US009093763B2

(12) United States Patent
Delplace et al.

(10) Patent No.: US 9,093,763 B2
(45) Date of Patent: Jul. 28, 2015

(54) SUPERCONDUCTING CABLE JOINT

(71) Applicant: NEXANS, Paris (FR)

(72) Inventors: Sebastien Delplace, Loon-Plage (FR); Nicolas Lallouet, Fiennes (FR)

(73) Assignee: NEXANS, Paris (FR)

( * ) Notice: Subject to any disclaimer, the term of this patent is extended or adjusted under 35 U.S.C. 154(b) by 0 days.

(21) Appl. No.: 14/468,676

(22) Filed: Aug. 26, 2014

(65) Prior Publication Data
US 2015/0080221 A1      Mar. 19, 2015

(30) Foreign Application Priority Data

Sep. 19, 2013   (FR) ...................................... 13 59022

(51) Int. Cl.
*H01B 12/16*   (2006.01)
*H01R 4/68*    (2006.01)
*H01F 6/06*    (2006.01)

(52) U.S. Cl.
CPC ................. *H01R 4/68* (2013.01); *H01B 12/16* (2013.01); *H01F 6/065* (2013.01)

(58) Field of Classification Search
CPC ........... H01R 4/68; H01B 12/16; H01F 6/066
See application file for complete search history.

(56) References Cited

U.S. PATENT DOCUMENTS

| 7,849,704 | B2 * | 12/2010 | Ashibe et al. ................ 62/259.2 |
| 8,260,388 | B2 * | 9/2012 | Yagi et al. ..................... 505/232 |
| 2004/0256126 | A1 * | 12/2004 | Ashibe et al. ................ 174/15.5 |
| 2006/0254804 | A1 * | 11/2006 | Ashibe et al. ............. 174/125.1 |
| 2009/0082210 | A1 | 3/2009 | Ashibe |
| 2010/0184604 | A1 | 7/2010 | Roden et al. |

FOREIGN PATENT DOCUMENTS

JP    H0955241    2/1997

OTHER PUBLICATIONS

International Search Report dated 2014.

* cited by examiner

*Primary Examiner* — Colleen Dunn
(74) *Attorney, Agent, or Firm* — Sofer & Haroun, LLP

(57) ABSTRACT

A joint is provided between two abutting cables, where the cables each have, around a central support, at least one phase layer composed of at least one layer of superconducting material and a neutral layer that are concentric and contained in a shell, filled with cryogenic fluid. The neutral layer of each cable is also stripped, at least one bridging support member is placed between the stripped neutral layers, and a layer of conducting or superconducting material, for, the electrical connection of these neutral layers, is placed on the support member.

15 Claims, 3 Drawing Sheets

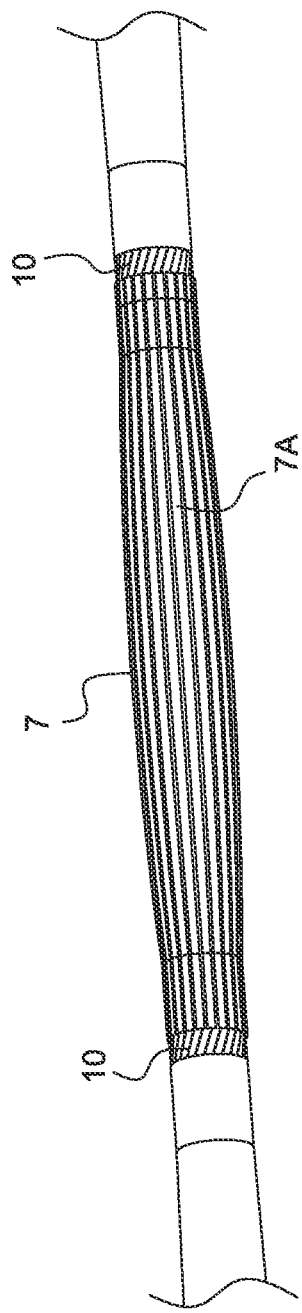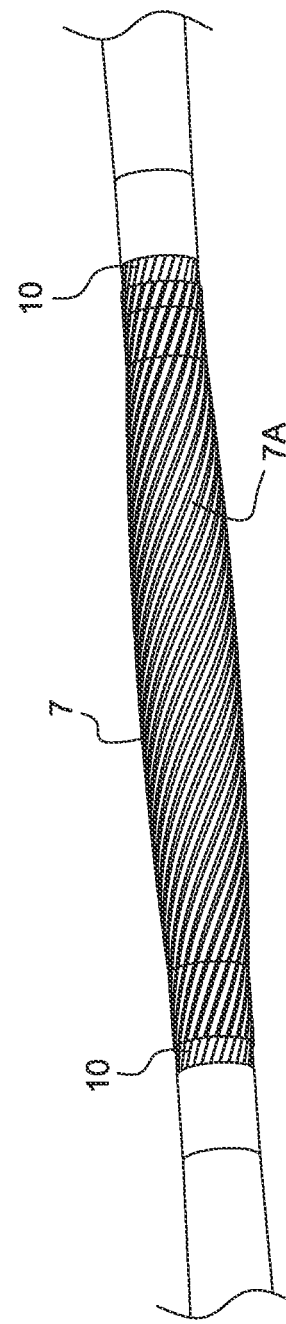

SUPERCONDUCTING CABLE JOINT

RELATED APPLICATION

This application claims the benefit of priority from French Patent Application No. 13 59022, filed on Sep. 19, 2013, the entirety of which is incorporated by reference.

BACKGROUND

1. Field of the Invention

The invention relates to a superconducting cable joint.

More specifically, it relates to a joint between two abutting cables, each cable comprising, around a central support, at least one phase layer composed of at least one layer of superconducting material and a neutral layer, these layers being concentric and contained in a shell filled with cryogenic fluid.

2. Description of Related Art

Patent EP 2 006 862 discloses the use of three single-phase cables for each cable and the connection of two abutting cables of the same phase. The two abutting phase layers of superconducting material are then connected by a central conducting element covered with at layer of complementary insulating material.

The invention also relates to cables comprising, around a central support, three concentric phases each composed of at least one layer of superconducting material, these layers being separated by a layer of insulating material.

The assembly formed by each cable may be covered with a screen connected to neutral and with an outer sheath, as described in US 2010/0184604. These cables are contained in a shell filled with cryogenic fluid, generally liquid nitrogen. The latter document describes a complex cable joint which is time-consuming to produce, being formed by reconstituting the layers of superconducting material, and the layers of insulating material by means of an arrangement in stages with superimposition.

The invention relates to a joint between two abutting cables, each cable comprising, around a central support, at least one phase layer composed of at least one layer of superconducting material and a neutral layer, these layers being concentric, the joint being reliable and easily produced.

For this purpose, the invention proposes a joint between two abutting cables, each cable comprising, around a central support, at least one phase layer composed of at least one layer of superconducting material and a neutral layer, these layers being concentric and contained in a shell filled with cryogenic fluid, said abutting inner phase layers being stripped and being directly connected, characterized in that said neutral layer of each cable is also stripped, at least one bridging support member is placed between said stripped neutral layers, and a layer of conducting or superconducting material for electrically connecting these neutral layers is placed on said bridging support member.

In a preferred embodiment, said support member is formed by a bridging element of tubular insulating material beveled at its ends.

Very advantageously, a longitudinal cylindrical space filled with cryogenic fluid is provided between the joint of said inner phase layers of superconducting material and the bridging support member.

In this embodiment, the forming of the joint, makes use of the dielectric properties of the cryogenic fluid contained in the enclosure.

Said bridging support members may be made at least partially of metal and/or at least partially of insulating material.

Preferably, each cable comprises, around a central support, three concentric phase layers, each composed of at least one layer of superconducting material and a neutral layer, these layers being separated by a layer of insulating material, the innermost abutting phase layers being stripped and directly connected, and said layers of superconducting material are stripped in a staged way, from the innermost phase to the neutral, moving away from the joint end, while a bridging support member is placed between each stripped phase or neutral layer and the other same layer, and a layer of conducting or superconducting material for the electrical connection of the same phase or neutral layers is placed on each support member.

In a preferred embodiment, said support members are each formed by a bridging element of tubular insulating material beveled at its ends.

Very advantageously, a longitudinal tubular space filled with cryogenic fluid is provided between said innermost, phase layers of superconducting material and the subsequent bridging support member, and a longitudinal, tubular space filled with cryogenic fluid is also provided between each bridging support member and each said layer of conducting or superconducting electrical connection material placed on the innermost bridging support member.

Said bridging support members may be made at least partially of metal and/or at least partially of insulating material.

Said insulating material is preferably paper.

Said metal is preferably aluminum or stainless steel.

Very advantageously, said bridging support members are prefabricated.

This prefabrication is particularly advantageous because it enables the joint to be produced very rapidly and easily and also allows a high degree of safety to be achieved, particularly at high voltage, as the prefabricated elements have precise shapes and dimensions which are independent of human error or approximation.

Preferably, each said layer of conducting or superconducting electrical connection material is formed from strands or tapes laid in a distributed manner on said bridging element.

Also advantageously, each said electrical connection layer is made of superconducting material.

Thus the electrical connections throughout the joint are practically exclusively superconducting, since the connection resistance between the strands or tapes is extremely low at cryogenic temperatures. The joint therefore provides virtual continuity of the superconducting property of the cable with virtually no Joule effect losses. In the first place, this enables the losses of the system to be reduced; furthermore, it can considerably reduce the risk of local heating compared with a resistive connection which could cause a local transition of the cable outside its critical temperature, possibly resulting in destruction.

Moreover, the overall dimensions of this connection using superconducting copper strands or tapes are smaller than those of the same connection using resistive copper tapes or strands.

BRIEF DESCRIPTION OF THE DRAWINGS

The invention is described below in greater detail with the aid of figures which show preferred embodiments of the invention.

FIGS. 6 and 7 are views in partial perspective of two preferred embodiments.

DETAILED DESCRIPTION

Figure 1:
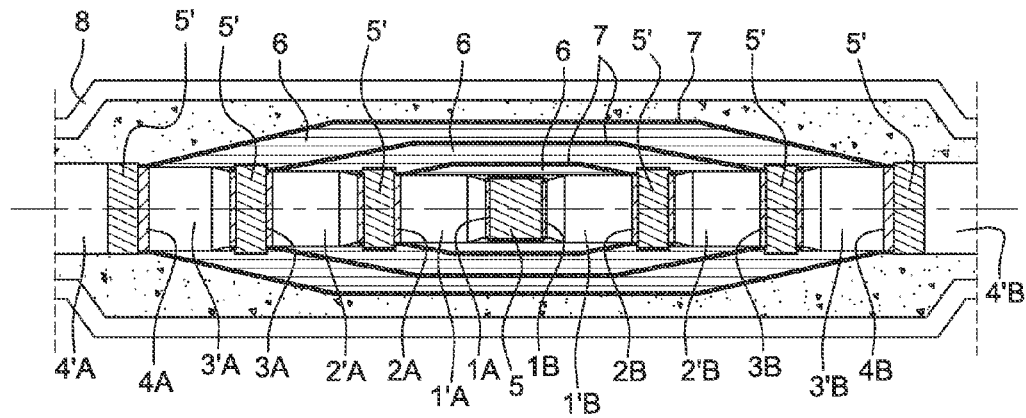
FIGS. 1 to 5 are views in longitudinal section of embodiments of the invention.

FIG. 1 shows a first embodiment according to the invention.

This first embodiment relates to a joint between two abutting cables, each cable comprising, around a central support, three concentric phase layers 1A, 2A, 3A, 1B, 210, 310, each formed by at least one layer of superconducting material, these layers being separated by a layer of insulating material 1'A, 2'A, 3'A, 1'B, 2'B, 3'B. In this case, a neutral layer 4A, 410 is itself covered with an insulating sheath. 4'A, 4'B, but this insulating sheath is not necessarily present. This neutral layer 4A, 410 may include a layer of superconducting material or a layer of conventional resistive conducting material such as copper. In the following text, it is assumed that the neutral layer 4A, 4B does include a layer of superconducting material.

The cables and their connection are contained in a shell 8 filled with cryogenic fluid.

The abutting innermost phase layers of superconducting material 1A, 1B, in other words the first phase layers, are stripped, and in this case are directly connected by an electrical connection 5 of the conducting sleeve type. This sleeve may also contain superconducting tapes which provide a superconducting link between the layers of superconducting material of the two cables.

The layers of superconducting material are stripped in a staged manner, from the innermost phase 1A, 1B to the outermost phase which is the neutral layer 4A, 4B, moving away from the connection end. A bridging support member 6 is placed between each stripped phase or neutral layer and the other same layer 2A, 3A, 4A, 2B, 3B, 4B, and a layer of conducting or superconducting material 7 for the electrical connection of the same phases or the neutral is placed on each support member.

This layer of conducting or superconducting material 7 may be formed by superconducting tapes, copper tapes and/or copper braids or lattices. The electrical connection at each end of these additional layers 7 is formed by a conducting member 5', preferably a conducting sleeve filled with brazing alloy of the tin type.

The support members 6 are each formed by a bridging element of tubular insulating material beveled at its ends. They are preferably made of paper in strip form wound around the cables.

These bridging elements 6 fill the whole of the space between the layers of conducting or superconducting material 7, and serve to provide mechanical support for the layers of conducting or superconducting material 7 and also to electrically insulate the electrical joint of each phase and the neutral.

This first embodiment can also be applied to a joint between two single-phase cables.

Figure 2:
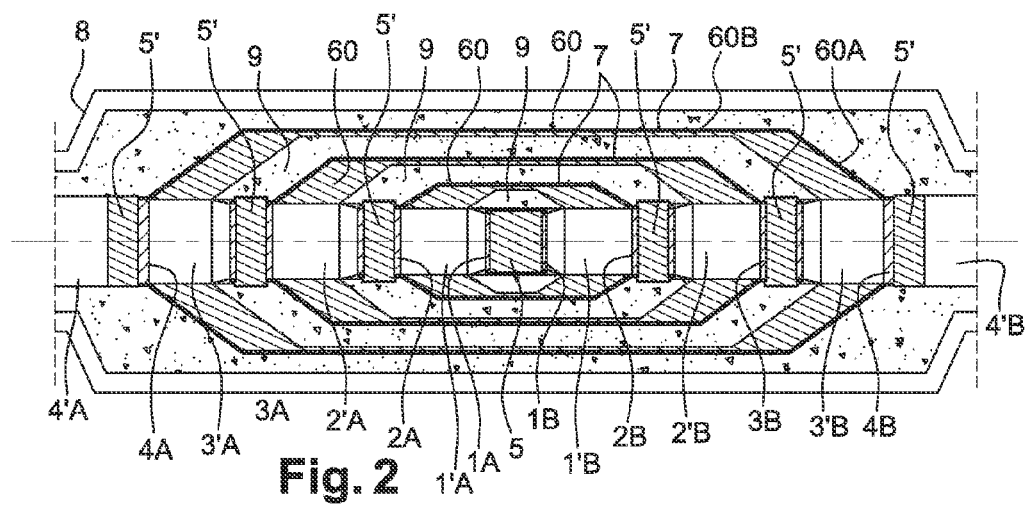

FIG. 2 shows a second embodiment according to the invention.

Components which are identical to those of the preceding embodiment are not described again.

In this embodiment, a longitudinal tubular space 9 filled with cryogenic fluid is provided between the innermost phase layers of superconducting material 1A, 1B and the subsequent bridging support member 60, and a longitudinal tubular space filled with cryogenic fluid 9 is also provided between each bridging support member 60 and each layer of conducting or superconducting electrical connection material 7 placed on the inner bridging support member 60.

The bridging support members 60 are formed by a truncoconical end part 60A and a straight tubular cylindrical part 60B.

In this embodiment, they are made of metal, for example aluminum or stainless steel, and each is prefabricated in the form of two semitubular half-members which are placed one each side over the length of the connection.

Figure 3:
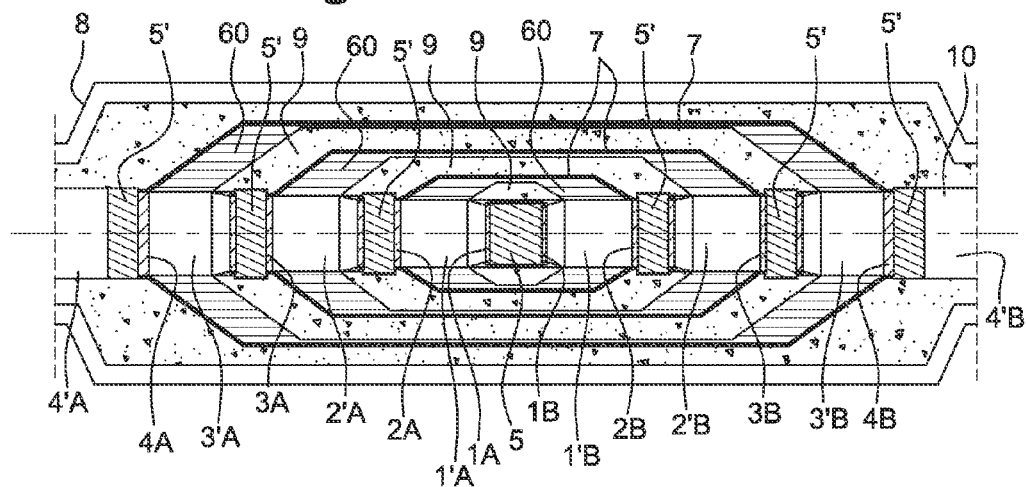

FIG. 3 shows a third embodiment according to the invention.

Components which are identical to those of the preceding embodiment are not described again.

In this embodiment, the bridging members 60 are made of insulating material, for example paper, and may each be prefabricated in the form of two semitubular half-members which are placed one each side over the length of the connection.

Figure 4:
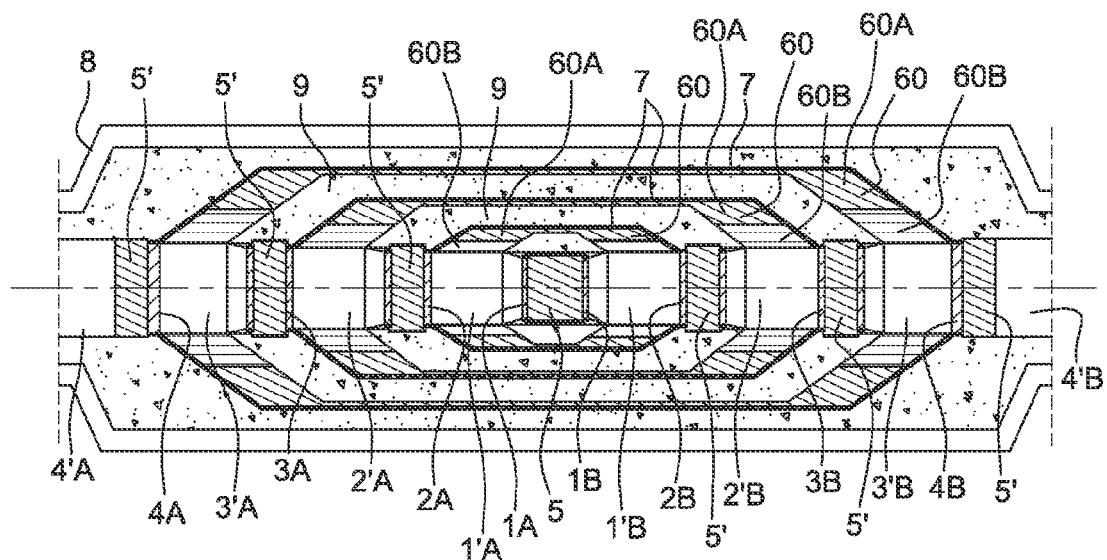

FIG. 4 shows a fourth embodiment according to the invention.

Components which are identical to those of the preceding embodiment are not described again.

In this embodiment, the bridging members 60 are made partially of insulating material 60B, for example paper, and partially of metal 60A, for example aluminum or stainless steel, and are preferably each prefabricated in the form of two semitubular half-members which are placed one each side over the length of the connection.

Figure 5:
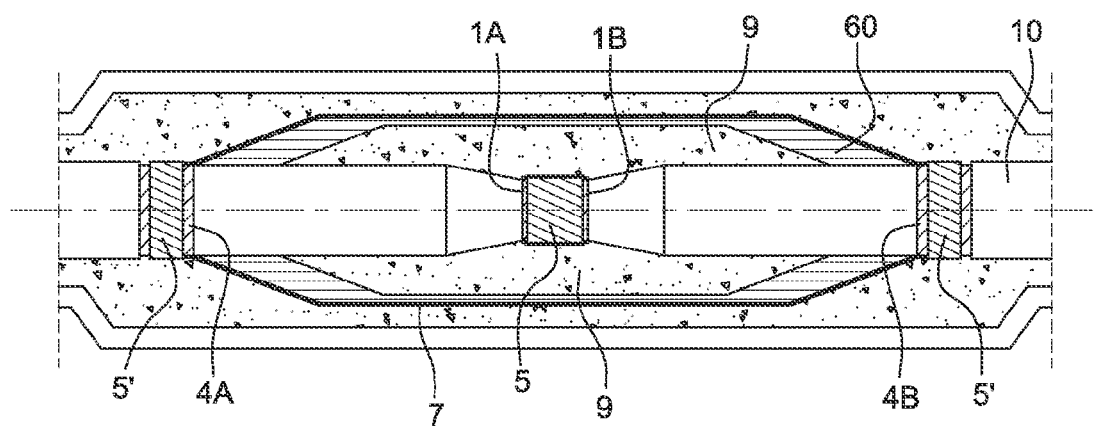

FIG. 5 shows another embodiment according to the invention.

In this case, the two abutting cables are single-phase, and each cable comprises, around a central support tube, a phase layer composed of at least a layer of superconducting material and a neutral layer, contained in a shell filled with cryogenic fluid.

The abutting inner phase layers of superconducting material 1A, 1B are stripped, and are directly connected by an electrical connection 5 of the conducting sleeve type.

The neutral layer of superconducting material 4A, 4B of each cable is also stripped, a bridging support member 60 is placed between the stripped neutral layers of superconducting material, and a layer of conducting or superconducting material 7, for the electrical connection of these neutral layers of superconducting material 4A, 4B, is placed on the support member 60.

A longitudinal tubular space 9 filled with cryogenic fluid is provided between the connection of the phase layers of superconducting material 1A, 1B and the bridging support member 60.

This bridging support member 60 may be made of metal and/or insulating material 60B, for example aluminum or stainless steel and/or paper, and is preferably prefabricated in the form of two semitubular half-members which are placed one each side over the length of the connection.

FIGS. 6 and 7 show two preferred embodiments of the electrical connection layers 7.

Each layer of conducting or superconducting electrical connection material 7 is formed from strands or tapes 7A laid on the corresponding bridging element 6, 60 in a regularly distributed manner on the surface of the latter.

The number of these conductors 7A is preferably equal to the number of superconducting tapes 10 to be connected in the corresponding phase layer 1A, 2A, 3A, 1B, 2B, 3B or neutral layer 4A, 4B of the cable. A tape or a strand 7A is connected at each end to a tape of the corresponding phase or neutral layer of the cable. These superconducting strands or tapes 7A preferably have a critical current greater than that of the tapes 10 forming the phase or neutral layer to be connected.

Preferably, each electrical connection layer 7 is made of superconducting material, for example high-temperature superconducting tapes 7A of the BSCCO or YBCO type.

The layer may also be made of copper conductors in a number at least equal to the number of superconducting tapes 10 to be connected in the corresponding phase or neutral layer. In this case, the total cross section of the resistive material, such as copper, for the passage of the current is determined, in order to avoid any heating in the joint.

In the embodiment shown in FIG. 6, the tapes 7A are placed parallel to the longitudinal axis of the joint and are contiguous at the ends of the bridging element, at their connection with the superconducting tapes 10.

In the embodiment shown in FIG. 7, the tapes 7A are wound around the corresponding bridging element, and are contiguous at the ends of the bridging element, at their connection with the superconducting tapes 10.

The invention claimed is:

1. Joint between two abutting cables, each cable comprising:
    around a central support, at least one phase layer composed of at least one layer of superconducting material; and
    a neutral layer, these layers being concentric and contained in a shell filled with cryogenic fluid,
    said abutting inner phase layers being stripped and being directly connected,
    wherein said neutral layer of each cable is also stripped, at least one bridging support member is placed between said stripped neutral layers, and a layer of conducting or superconducting material for electrically connecting these neutral layers is placed on said bridging support member.

2. Joint according to claim 1, wherein said support member is formed by a bridging element of tubular insulating material beveled at its ends.

3. Joint according to claim 1, wherein a longitudinal tubular space filled with cryogenic fluid is provided between the connection of said inner phase layers of superconducting material and the bridging support member.

4. Joint according to claim 3, wherein said bridging support members are made at least partially of metal.

5. Joint according to claim 3, wherein said bridging support members are made at least partially of insulating material.

6. Joint between two abutting cables according to claim 1, each cable comprising:
    around a central support, three concentric phase layers, each composed of at least one layer of superconducting material and a neutral layer, these layers being separated by a layer of insulating material, said innermost abutting phase layers being stripped and directly connected,
    wherein said layers of superconducting material are stripped in a staged way, from the innermost phase to the neutral, moving away from the connection end, while a bridging support member is placed between each stripped phase or neutral layer and the other same layer, and a layer of conducting or superconducting material for the electrical connection of the same phase or neutral layers is placed on each support member.

7. Joint according to claim 6, wherein said support members are each formed by a bridging element of tubular insulating material beveled at its ends.

8. Joint according to claim 6, wherein a longitudinal tubular space filled with cryogenic fluid is provided between said innermost phase layers of superconducting material and the subsequent bridging support member, and a longitudinal tubular space filled with cryogenic fluid is also provided between each bridging support member and each said layer of conducting or superconducting electrical connection material placed on the innermost bridging support member.

9. Joint according to claim 8, wherein said bridging support members are made at least partially of metal.

10. Joint according to claim 8, wherein said bridging support members are made at least partially of insulating material.

11. Joint according to claim 2, wherein said insulating material is paper.

12. Joint according to claim 4, wherein said metal is aluminum or stainless steel.

13. Joint according to one of the claims, wherein said bridging support members are prefabricated.

14. Joint according to claim 1, wherein each said layer of conducting or superconducting electrical connection material is formed from strands or tapes laid in a distributed manner on said bridging element.

15. Joint according to claim 1, wherein each said electrical connection layer is made of superconducting material.

* * * * *